United States Patent
Winter et al.

(10) Patent No.: US 7,262,255 B2
(45) Date of Patent: Aug. 28, 2007

(54) POLYESTER RESIN EMULSION AND TWO-COMPONENT AQUEOUS PAINT

(75) Inventors: Reinhard Winter, Wülfrath (DE); Peter Kuhlmann, Wülfrath (DE); Jörg Schwarte, Essen (DE)

(73) Assignee: Ashland-Sudchemie-Kernfest GmbH, Wulfrath (DE)

( * ) Notice: Subject to any disclaimer, the term of this patent is extended or adjusted under 35 U.S.C. 154(b) by 0 days.

(21) Appl. No.: 10/473,306

(22) PCT Filed: Mar. 28, 2002

(86) PCT No.: PCT/DE02/01152

§ 371 (c)(1),
(2), (4) Date: Apr. 5, 2004

(87) PCT Pub. No.: WO02/079296

PCT Pub. Date: Oct. 10, 2002

(65) Prior Publication Data

US 2004/0157986 A1     Aug. 12, 2004

(30) Foreign Application Priority Data

Mar. 30, 2001   (DE) ................ 101 15 933

(51) Int. Cl.
  *C08L 75/06*       (2006.01)
  *C08L 67/02*       (2006.01)

(52) U.S. Cl. ............. 525/440; 524/589; 524/590; 524/591; 528/80; 528/83; 528/85; 528/272

(58) Field of Classification Search ............ None
See application file for complete search history.

(56) References Cited

U.S. PATENT DOCUMENTS

| | | | | |
|---|---|---|---|---|
| 3,223,659 A | * | 12/1965 | Curtice et al. | 524/596 |
| 3,442,835 A | | 5/1969 | Curtice et al. | 206/22 |
| 3,639,315 A | | 2/1972 | Rodriguez | 260/22 |
| 6,787,599 B1 | * | 9/2004 | Kuhlmann et al. | 524/591 |

FOREIGN PATENT DOCUMENTS

| DE | 19822468 A1 | 1/1999 |
|---|---|---|
| WO | WO93/03157 | 2/1993 |
| WO | WO-9960044 A1 * | 11/1999 |
| WO | WO02/31021 | 9/2001 |

OTHER PUBLICATIONS

Definition of the term "fatty acid" taken from Hawley's Condensed Chemical Dictionary, 14th Edition.*
GB Patent Specification 1,038,696, dated: May 17, 1963, 8 pgs.
Japanese Patent Abstract, Publication No. 01029425A, Publication date: Jan. 31, 1989, 1 pg.
International Search Report as issued on Oct. 23, 2002, 4 pgs.
U.S. Environmental Protection Agency, Design for the Environment (DfE), "Isocyanates Profile." From website: http://www.epa.gov/dfe/pubs/auto/profile/index.htm) (8 pgs) Mar. 2006.
RTI International, Coatings Guide™, Glossary of Terms, "Coatings and Their Constitutents," From website: http://cage.rti.org/glossary.cfm?cat=Coatings+and+Their+Constitutents) (13 pgs) Sep. 2002.
Ullmann's Encyclopedia of Industrial Chemistry, Sixth, Completely Revised Edition, vol. 2, (pp. 173-177), Dec. 2002.
Ullmann's Encyclopedia of Industrial Chemistry, Sixth, Completely Revised Edition, vol. 13 (pp. 4,5,57,59,60 and 64), Dec. 2002.
Apricot Oil: Woodland Nut—Nut Oils & Meals, web page http://www.woodlandnut.com/apricot.html, Sep. 9, 2005 (1 pg).
ChemicalLAND21.com web page http://www.chemicalland21.com/arokorhi/specialtychem/finechem/TALL%20OIL.htm, Tall Oil, Sep. 9, 2005 (2 pg).
Kirk-Othmer Encyclopedia of Chemical Technology, Fourth Edition, vol. 2, (p. 62), Jan. 1999.
Kirk-Othmer Encyclopedia of Chemical Technology, Fourth Edition, vol. 10 (p. 267), Jan. 1999.

* cited by examiner

Primary Examiner—Marc S. Zimmer
(74) Attorney, Agent, or Firm—Kagan Binder, PLLC

(57) ABSTRACT

The present invention relates to a hydroxy-functional polyester resin, which is obtainable by reaction of a composition, which contains (i) a low-molecular polyvalent alcohol having at least two hydroxyl groups per molecule, (ii) a polyether polyol, (iii) a monofunctional saturated aliphatic, cycloaliphatic or aromatic carboxylic acid, and (iv) a polycarboxylic acid having at least two carboxyl groups. The invention further relates to a resin emulsion and a mother paint comprising an aqueous emulsion of the polyester resin, a two-component water-based paint system, comprising the resin emulsion or the mother paint and an isocyanate component as well as a method for the preparation of the water-based paint system.

15 Claims, No Drawings

POLYESTER RESIN EMULSION AND TWO-COMPONENT AQUEOUS PAINT

The invention relates to a polyester resin, an aqueous polyester resin emulsion, a two-component water-based paint system as well as a method for the preparation thereof.

Due to ecological problems and the associated pressure to reduce solvent emissions, water-based paints have widely spread in different areas and have substituted solvent-containing paint materials in many cases.

Aqueous two-component polyurethane systems have proven themselves for years in areas with high demands to weatherability, protection against corrosion and resistance to chemicals. These two-component systems consist of a polyol and an isocyanate component, which are mixed only a short time before processing.

One-component and two-component paints differ in particular significantly in quality from one another. Two-component polyurethane paints are clearly superior to air-drying one-component paints in both the mechanical properties, such as elasticity and hardness, as well as the resistance to weather, solvents and influences of the environment.

Oligomeric isocyanates, for example based on hexamethylene diisocyanate or isophorone diisocyanate, are mainly employed as isocyanate components. Hydroxy-functional acrylate dispersions, hydroxy-functional polyester and alkyd resins as well as hydroxy-functional polyurethane dispersions are in principle suitable as polyol components.

The spreading of these paint systems continues to increase for example in paints for vehicles as well as in paints for plastics, furniture and in industry.

However, a wide spreading has been hampered in many cases by the problem of a lack of reproducibility of the process. Under unfavorable curing conditions, for example unfavorable climatic conditions (high humidity), the formation of bubbles occurs during drying due to $CO_2$ development from the side reaction of the isocyanate with water. In particular, at high layer thicknesses this results in undesired formation of bubbles in connection with unevenness of the surface. According to the conditions for drying, depending on temperature and humidity, such systems allow for the reproducible preparation of layer thicknesses of at most 60 to 80 μm.

An alkyd resin system is described in DE-A-198 22468 which is characterized by a low tendency towards formation of bubbles and therefore improved process reproducibility. However, due to an albeit low tendency towards yellowing caused by the oil components contained therein, this system is not suitable for applications with the highest demands to product properties, for example weatherability, protection against corrosion and resistance to chemicals or mechanical properties, such as encountered for example in the area of automotive coating and repair paints.

A further disadvantage of known paint systems based on alkyd resins of natural oils is an albeit only very low decrease of the degree of gloss and/or change of the mechanical properties of the paint layer under common aging conditions (in particular exposure to parts of the UV-radiation spectrum and/or elevated temperature), which may have negative effects in applications with the highest demands.

The object of the present invention is to provide a resin system for a two-component water-based paint system, which is characterized by an at most low tendency towards the formation of bubbles and which fulfills even the highest demands regarding the tendency towards yellowing and weatherability. In the long term, the degree of gloss and/or the mechanical properties should not experience a significant reduction, either.

The resin system should preferably be stably dispersible in water without the use of organic solvents or at most with a low fraction of solvents, in order to obtain paint systems with favorable VOC values.

This object is achieved by the subject-matter of the present invention. The invention refers to a hydroxy-functional polyester resin for the application in two-component water-based paint systems, which is obtainable by reaction of a composition, containing
  (i) at least one low-molecular, polyvalent alcohol having at least two hydroxyl groups per molecule,
  (ii) at least one polyether polyol,
  (iii) at least one monofunctional saturated aliphatic, cycloaliphatic or aromatic carboxylic acid, and
  (iv) at least one polycarboxylic acid having at least two carboxyl groups per molecule.

The invention further refers to a resin emulsion, comprising an aqueous emulsion of the polyester resin, as well as a mother paint comprising the resin emulsion and one or more additives, selected from the group consisting of pigments, fillers, auxiliaries and cosolvents.

Furthermore, the present invention refers to a two-component water-based paint, which comprises the aqueous emulsion of the hydroxy-functional polyester system and an isocyanate component.

The invention further refers to a method for the preparation of a two-component water-based paint system, which comprises the steps of:

providing a polyester resin component (A) by
  (a) reacting of a composition, containing at least one low-molecular, polyvalent alcohol having at least two hydroxyl groups per molecule, at least one polyether polyol, at least one monofunctional saturated aliphatic, cycloaliphatic or aromatic carboxylic acid, and at least one polycarboxylic acid having at least two carboxyl groups to obtain a hydroxy-functional polyester resin,
  (b) neutralizing the hydroxy-functional polyester resin with ammonia or amine,
  (c) emulsifying the hydroxy-functional polyester resin in water, and
  (d) optionally adding one or more additives, selected from the group consisting of pigments, fillers, auxiliaries and cosolvents, as well as providing an isocyanate component (B).

The aqueous paints according to the present invention are suitable for different substrates, such as metal, plastic or wood, and are therefore suitable for both ground coatings and fillers as well as top coating paint systems.

The system according to the present invention is characterized by a very low sensitivity to bubbles, so that layer thicknesses of 120 to 150 μm and more can be obtained without the undesired formation of bubbles.

Furthermore, the system according to the present invention is characterized by a high UV-resistance. This allows for the preparation of paint systems, which are adequate for applications with the highest demands. In particular, problems which may be caused by a change of the paint layer due to the impact of UV-radiation, for example changes in the mechanical properties and brittleness, but also optical changes, such as yellowing can be reduced to a minimal extent or can even be prevented.

The two-component water-based paint systems of the present invention possess a high storage stability. Furthermore, the use of ecologically harmful or toxic solvents can be avoided.

As compared to conventional water-based paint systems based on alkyd resins of natural fats and oils, the water-based paint systems of the present invention have the further advantage of a more precise adjustability of the properties of the end product.

Since natural fats and oils are mixtures the composition of which is not completely known and which can be subject to natural variations, small problems with regard to the reproducibility of the exact composition may result. These problems can be circumvented by the systems of the present invention. Furthermore, a wider spectrum of variations of the desired properties of the end product results, which can be adjusted in a target-oriented and reproducible manner.

The paint systems of the present invention provide paint layers with a high and stable gloss.

Polyester Resin Component (A)

The polyester resin component (A) according to the present invention comprises an aqueous emulsion of a hydroxy-functional polyester resin, which is obtainable by reaction (polycondensation, esterification) of an alcohol component and an acid component.

The alcohol component contains (i) at least one polyvalent, low-molecular alcohol having at least two hydroxyl groups and (ii) at least one polyether polyol.

The acid component contains (iii) at least one monofunctional, saturated aliphatic or cycloaliphatic or aromatic carboxylic acid and (iv) at least one polycarboxylic acid having at least two carboxyl groups.

The polyester resin component according to the present invention is characterized by not containing any ethylenically unsaturated monofunctional carboxylic acid moieties. In a preferred embodiment none of the components (i) to (iv) employed for the preparation of the polyester resin have an ethylenically unsaturated character.

Polyvalent Alcohol (i)

Suitable polyvalent alcohols (i) are saturated, aliphatic alcohols having at least two, preferably more than two, hydroxyl groups per molecule. In the present invention compounds which are either monomolecular or have a very low degree of oligomerization, for example di-, tri- or tetramolecular compounds, are considered to be low-molecular alcohols. Such low-molecular compounds usually have a molecular weight of less than 400, preferably less than 200.

It is particularly preferable to use alcohols which have at least two, in particular more than two, but not more than six hydroxyl groups per molecule. Typical alcohols (i) have 2 to 20, preferably 2 to 8, carbon atoms.

Examples of suitable polyvalent alcohols (i) are
divalent alcohols of the general formula

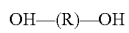

OH—(R)—OH wherein R is a divalent saturated aliphatic or cycloaliphatic hydrocarbon group, which may contain one or more (preferably not more than 4) oxygen atoms, which do not form a peroxide moiety, and preferably 2 to 20, more preferably 2 to 8 carbon atoms, such as ethylene glycol, diethylene glycol, propylene glycol, dipropylene glycol, butylene glycol, dibutylene glycol or neopentyl glycol;

higher valent alcohols of the general formula

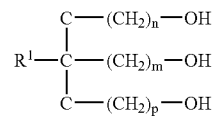

wherein n, m and p are independently 0, 1, 2 or 3, and $R^1$ is a saturated aliphatic or cycloaliphatic $C_1$-$C_6$ hydrocarbon group or an OH—$(CH_2)_q$— group, wherein q represents 0, 1, 2 or 3 (with the proviso that q and m are not simultaneously 0), such as glycerine, trimethylol ethane, trimethylol propane or pentaerythritol;

other higher valent alcohols, such as cyclohexanediol, threitol, erythritol, arabitol, adonite, xylite, dipentaerythritol, sorbite, mannitol and dulcitol.

Of course, mixtures of these alcohols may also be used.

In a preferred embodiment of the present invention at least two different multivalent alcohols are used as component (i). The mixture is to be preferably selected such that the average functionality is at least 2.0, preferably more than 2.0, in particular 2.1 to 4.5.

A composition in which the amount of the component (i) is about 10 to 40 wt. % based on the sum of all components (i) to (iv) is preferably used for the preparation of the polyester resin.

Polyether Polyol (ii)

Higher-molecular polyether polyols (ii), such as polyethylene glycol, polypropylene glycol and polytetrahydrofurane, are incorporated to facilitate emulsification in addition to the low-molecular polyalcohols (i) mentioned. In contrast to the alcohols employed as component (i), the polyether polyols are polymeric substances with a degree of polymerization of typically more than 8, preferably 50 to 200. The preferred molecular weight of the employed polyether polyols is 400 to 8000, in particular 1000 to 6000. Mixtures of the polyether polyols are included according to the present invention.

A composition in which the amount of the component (ii) is about 3 to 15 wt. % based on the sum of all components (i) to (iv) is preferably used for the preparation of the polyester resin.

Monocarboxylic Acid (iii)

The monocarboxylic acids (iii) of the present invention may be saturated aliphatic, cycloaliphatic or aromatic compounds. Therefore, basically all conventional carboxylic acids are suitable as component (iii), as long as they do not have any ethylenically unsaturated moieties. They can be used separately or as a mixture.

Suitable monocarboxylic acids are for example those of the general formula

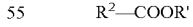

$R^2$—COOR' wherein $R^2$ is an aromatic, optionally substituted by straight-chain or branched alkyl groups, hydrocarbon group or a straight-chain or branched saturated aliphatic or cycloaliphatic hydrocarbon group preferably having 6 to 30 carbon atoms, in particular 6 to 18 carbon atoms, and R' may be a hydrogen atom (free acid), a straight-chain or branched $C_1$-$C_4$ alkyl group (ester) or —(CO)$R^2$ (anhydride).

Typical examples therefor are isodecanoic acid, isooctanoic acid, cyclohexanoic acid, benzoic acid, p-tert-butylbenzoic acid and long-chain carboxylic acids as well as naturally occurring saturated fatty acids.

Examples for naturally occurring saturated carboxylic or fatty acids are palmitic and stearic acid. However, technically completely hydrated modifications of natural, unsaturated fatty and oil acids are also well suited.

Furthermore, carboxylic acids may also be used, which contain an additional hydroxyl group in addition to the carboxyl group, such as is the case for example in the fatty acid of castor oil, in dimethylolpropionic acid or in hydrolyzed, epoxidized fatty acids.

For the preparation of the polyester resin, the monocarboxylic acids may be used in form of the free acids, anhydrides thereof or in form of esters of simple alcohols (for example $C_1$-$C_4$ monoalcohols).

In the present invention, saturated aliphatic or cycloaliphatic monocarboxylic acids are preferably used.

The component (iii) consists of a mixture of at least two different monocarboxylic acids in a particularly preferred embodiment.

A composition in which the amount of the component (iii) is about 10 to 40 wt. % based on the sum of all components (i) to (iv) is preferably used for the preparation of the polyester resin.

Polycarboxylic Acid (iv)

The polycarboxlic acids used in the present invention have at least two carboxyl groups per molecule and may be used separately or as a mixture.

Suitable polycarboxylic acids have 4 to 15, preferably 4 to 10, carbon atoms per molecule and include aliphatic, cycloaliphatic and aromatic polycarboxylic acids.

Surprisingly, in contrast to the monocarboxylic acids (iii) used in the present invention the polycarboxylic acids (iv) may have an ethylenically unsaturated character, without any negative effects on the UV-stability.

Suitable acids (iv) are for example dicarboxylic acids of the general formula

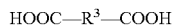

HOOC—$R^3$—COOH wherein $R^3$ is a divalent group, selected from the group consisting of a saturated, branched or straight-chain, aliphatic or cycloaliphatic group having 2 to 13 carbon atoms, (preferably having 2 to 6 carbon atoms), an aromatic hydrocarbon group, optionally substituted by alkyl groups, having a total of 6 to 13 carbon atoms (preferably having 6 to 10 carbon atoms), and an unsaturated, straight-chain or branched, aliphatic group having 2 to 13 carbon atoms (preferably having 2 to 6 carbon atoms).

Examples therefor are maleic acid, fumaric acid, succinic acid, terephthalic acid, isophthalic acid, adipinic acid, glutaric acid, azelaic acid and o-phthalic acid.

However, higher functional polycarboxylic acids, i.e. polycarboxylic acids having more than two (however, preferably not more than six) carboxyl groups per molecule may also be used.

Examples of higher functional polycarboxylic acids are tricarboxylic acids, such as trimellitic acid, tricarballylic acid, trimesic acid or hemimellitic acid, tetracarboxylic acids, such as pyromellitic acid, or polycarboxylic acids having more than three carboxyl groups such as mellitic acid.

Polycarboxylic acids having at least two carboxyl groups and additionally one or more OH groups such as malic acid, tartaric acid, meso-tartaric acid, paratartaric acid or citric acid may also be used as component (iv).

The polycarboxylic acids (iv) may be used in form of the free acids or as an anhydride or ester of simple $C_1$-$C_4$ alcohols for the preparation of the polyester resin.

It is particularly preferable to use dicarboxylic acids or the anhydrides or $C_1$-$C_4$ esters thereof as component (iv).

A mixture of at least two different polycarboxylic acids (preferably dicarboxylic acids) is used as component (iv) in another preferred embodiment. In this embodiment the average functionality is preferably at least 2.0, more preferably 2.0 to 3.0.

A composition in which the amount of the component (iv) is about 10 to 40 wt. % based on the sum of all components (i) to (iv) is preferably used for the preparation of the polyester resin.

Preparation of the Resin

The esterification of the alcohol and acid components is usually conducted in the temperature range of from 180 to 260° C. with elimination of water, which is removed from the reaction mixture by distillation. According to common practice in resin chemistry, removal of this water may also be promoted by azeotropic distillation or by vacuum.

The stoichiometric ratios are adjusted in a manner known to the person skilled in the art such that polyester resins are obtained having acid numbers from 5 to 20 and amounts of hydroxyl from 1 to 8 wt. %.

The amount of hydroxyl is determined according to common practice in the field with acetic anhydride. The determination of the acid number is conducted according to DIN 53402.

The polyester resin may be pre-crosslinked with isocyanates to increase the starting molecular weight and improve the physical drying or accelerate drying. However, not more than 30% of the available hydroxyl groups should be reacted in the pre-crosslinking of the hydroxy-functional polyester resin. The isocyanantes described below for component (B) may be used for the modification. The reaction with isocyanate is usually conducted in the temperature range of from 10 to 70° C., preferably from 20 to 50° C.

Surprisingly, the polyesters prepared according to the present invention are emulsifiable in water after the neutralization with ammonia or amines usually without the addition of solvents, in particular without the addition of emulsifiers. The resulting emulsions usually have a solids content of from 20 to 70%, preferably from 30 to 55% and a pH value of 6 to 9 and are characterized by excellent storage stability.

The neutralization may be achieved by addition of a small amount of a neutralizing agent, wherein a portion or all of the acid groups present in the resin are neutralized. Suitable neutralizing agents, which may be used according to the present invention, include ammonia, ammonium hydroxide and primary, secondary and tertiary mono- or polyamines, including hydroxyl amines and in particular lower alkyl amines, such as ethyl amine, butyl amine, dimethyl amine, diethyl amine, dimethylethyl amine, dimethylisopropyl amine, diethanol amine, triethanol amine or butanol amine. Amines, which are volatile at temperatures below 180° C., preferably below 120° C., are preferred. Ammonia, triethyl amine, dimethyl amine, dimethylisopropyl amine, dimethylethanol amine, ethanol amine, diethanol amine, triethanol amine, amino propanol or dimethylamino propanol are particularly preferred amines. The amines may be added in an undiluted form, whereby essentially water-free, neutralized resins are obtained, which may be virtually unlimitedly diluted or dispersed in water. Alternatively, the resins may be neutralized by addition of an aqueous solution or dispersion of amines. Likewise, inorganic neutralizing agents, such as potassium or sodium hydroxide or carbonates may be used for neutralization.

The resin is then adjusted to a desired viscosity in water, whereby an aqueous dispersion of from 5 to 55 wt. %, preferably from 25 to 55 wt. %, solid resin (non-volatile) is obtained.

The polyester resin emulsions described can be formulated as pigmented and non-pigmented mother paints using the additives conventionally used in the paint industry, such as pigments, fillers and auxiliaries. The addition of cosolvents is additionally possible to achieve improvement of the flow, the wettability and the surface quality.

Isocyanate Component (B)

The isocyanate component of the two-component water-based paint system of the present invention comprises a saturated aliphatic, cycloaliphatic or aromatic polyisocyanate, which preferably has an average functionality of at least two, in particular 2.0 to 4.5.

Suitable isocyanates comprise the diisocyanates and/or higher functional polyisocyanates conventionally used in the field. They may be used separately or as a mixture.

Examples of suitable isocyanates are:

Toluene-2,4-diisocyanate, toluene-2,6-diisocyanate, 3-phenyl-2-ethylenediisocyanate, 1,5-naphthalenediisocyanate, cumene-2,4-diisocyanate, 4-methoxy-1,3-diphenyldiisocyanate, 4-chloro-1,3-phenyldiisocyanate, diphenylmethane-4,4'-diisocyanate, diphenylmethane-2,4'-diisocyanate, diphenylmethane-2,2'-diisocyanate, 4-bromo-1,3-phenyldiisocyanate, 4-ethoxy-1,3-phenyldiisocyanate, 2,4'-diisocyanatodiphenylether, 5,6-dimethyl-1,3-phenyldiisocyanate, 2,4-dimethyl-1,3-phenyldiisocyanate, 4,4-diisocyanatodiphenylether, 4,6-dimethyl-1,3-phenyldiisocyanate, 9,10-antracenediisocyanate, 2,4,6-toluenetriisocyanate, 2,4,4'-triisocyanatodiphenylether, 1,4-tetramethylenediisocyanate, 1,6-hexamethylenediisocyanate, 1,10-decamethylenediisocyanate, 1,3-cyclohexylenediisocyanate, 4,4'-methylene-bis(cyclohexlisocyanate), Xylenediisocyanate, 1-isocyanato-3-methylisocyanato-3,5,5-trimethylcyclohexane (isophorone diisocyanate), 1,3-bis(isocyanato-1-methylethyl)-benzene (m-TMXDI), 1,4-bis(isocyanato-1-methylethyl)benzene (p-TMXDI) or trimethylhexamethylenediisocyanate.

However, oligomeric polyisocyanates such as those used in conventional, solvent-containing two-component paints are particularly suitable. These are for example pre-adducts, isocyanurates, uretdiones, allophates, etc. based on hexamethylene diisocyanate, isophorone diisocyanate and tolylene diisocyanate.

In addition, oligomeric polyisocyanates are also suitable, which contain hydrophilic components and were developed in particular for the use in water-based paint systems. Such isocyanates are described for example in EP-A-540 958, EP-A-645 410, EP-A-754 713 and EP-A-697 424.

In a preferred embodiment of the present invention only saturated, aliphatic and cycloaliphatic isocyantates are employed, i.e. such isocyanates, the isocyanate groups of which are only bound to saturated carbon atoms, wherein aromatic groups may be additionally be present, which, however, do not bear any isocyanate groups themselves.

Organic solvents, such as esters, ketones or ether acetates may be used to facilitate the incorporation of the isocyanate component. The amount of solvent usually used is in the range of from 10 to 40%, based on the isocyanate used.

Processing of the Paint

The isocyanate component described is mixed homogenously with the polyester resin emulsion or the mother paint a short time before the processing. Organic solvents, such as esters, ketones or alkylated esters of multivalent alcohols or oligomeric polyglycols, such as methoxypropyl acetate or methoxydiglycol acetate may also be added to the isocyanate component to facilitate the incorporation thereof The amount of solvent used is usually in the range of from 0 to 40 wt. % based on the isocyanate.

The mixing ratio of mother paint and isocyanate curing agent depends on the amount of hydroxyl in the polyester resin and the amount of NCO in the isocyanate. The stoichiometric ratios are calculated according to the so-called isocyanate base value. This defines the amount of polyisocyanate, which is equivalent to 100 parts by weight of the component containing hydroxyl groups.

$$\text{Isocyanate base value} = \frac{42 \times 100 \times \text{OH \% of the polyol component}}{17 \times \text{NCO \% of the isocyanate component}}$$

Depending on the desired properties, the amount of curing agent may be varied considerably. In water-based paint systems in practice significantly higher amounts of isocyanate are commonly calculated. For example, excesses of isocyanate of 20 to 70% are used.

The mixtures of mother paint and isocyanate component have a pot life of 10 min to 6 h at room temperature. The curing of the applied paint layer may be conducted either at room temperature or by forced drying at an elevated temperature, for example at 80 to 120° C.

The curing reaction can be accelerated with the catalysts conventionally used in the polyurethane chemistry, such as for example metal salts or amines.

Surprisingly, paint layers of more than 120 to 150 μm may be achieved with the two-component water-based paint systems according to the present invention without undesired formation of bubbles. These paint layers are characterized by high gloss and very good mechanical properties, such as hardness, elasticity, adhesion and in particular by excellent resistance to yellowing and UV.

The invention is further illustrated by the following, non-limiting examples.

EXAMPLES

Example 1

Preparation and Processing of a White Paint a) Preparation of a Polyester Resin Component (A)

1.67 kg glycerine, 12 kg pentaerythritol, 4.3 kg polyethylene glycol, 10 kg phthalic anhydride, 3.6 kg isophthalic acid, 9.1 kg p-tert-butylbenzoic acid and 7.9 kg 2-ethylhexanoic acid are heated with stirring to 240° C. and the resultant reaction water is distilled. The charge is kept at 240° C. until an acid number of 12 mg KOH/g is obtained.

The reaction mixture is neutralized with triethyl amine and emulsified in 52 kg water. An emulsion of fine particles having a solids content of about 43% and a pH value of 7 results.

b) Preparation of a White Paint

Using the emulsion of the polyester resin described in example 1a), a white paint is prepared according to the following formation:

| | |
|---|---|
| A | 60.0 parts by wt. polyester resin emulsion example 1a) |
| B | 27.8 parts by wt. titanium dioxide |
| C | 0.7 parts by wt. additive for dispersion (ethoxylated fatty alcohol) |
| D | 8.5 parts by wt. distilled water |

The preparation of the paint is conducted as usual in an agitator ball mill.

c) Curing of the Paint

The mother paint prepared according to example 1b) is mixed before the processing in a ratio of 4:1 with an isocyanate curing agent having the following composition:

| | |
|---|---|
| 70.0 parts by wt. | oligomeric isocyanate based on hexamethylene diisocyanate |
| 30.0 parts by wt. | methoxypropyl acetate |

The mixture has a pot life of about 3 h and can be processed to a dry layer thickness of more than 150 μm without the formation of undesired bubbles due to the development of $CO_2$.

The completely cured paint is characterized by high gloss, excellent resistance to yellowing as well as good hardness and elasticity.

In the accelerated weatherability test (1000 h QUV according to DIN 53384) no loss of gloss (method according to Gardner, 60°) and no visible yellowing was detected.

Example 2

Preparation of a Two-component PU Clear Paint

| | |
|---|---|
| 87.0 parts by wt. | emulsion according to example 1-a) |
| 2.0 parts by wt. | flow additive based on polysiloxane |
| 2.0 parts by wt. | butyldiglycol acetate |
| 9.0 parts by wt. | water | are homogeneously mixed for the preparation of a two-component PU clear paint. The isocyanate component from example 1-b) is admixed in a ratio of 3:1 before processing.

This clear paint mixture can also be processed to a dry layer thickness of up to 150 μm without formation of bubbles and is characterized by excellent UV-resistance and high gloss.

In the accelerated weatherability test (1000 h QUV according to DIN 53384) no loss of gloss (method according to Gardner, 60°) and no visible yellowing was detected.

Example 3

2.5 kg trimethylol propane, 4.1 kg polyethylene glycol, 14.8 kg isophthalic acid, 9.1 kg p-tert-butylbenzoic acid and 8.0 kg 2-ethylhexanoic acid are heated with stirring to 240° C. and the resultant water is distilled. The charge is kept at 240° C. until an acid number of 14 mg KOH/g is obtained.

The reaction mixture is neutralized with triethyl amine and subsequently emulsified in 55 kg water and the solids content of the emulsion is adjusted to 43%.

Using this emulsion, paints analogous to those of examples 1 and 2 were prepared.

In the accelerated weatherability test (1000 h QUV according to DIN 53384) no loss of gloss was measured (method according to Gardner, 60°) and no visible yellowing was detected.

Comparative Example 10 kg peanut oil, 3.8 kg polyethylene glycol, 9.5 kg pentaerythritol are kept for 3 h at 230° C. Subsequently, 12.6 kg phthalic anhydride and 3.8 kg pentaerythritol are added and esterified at 240° C. with elimination of water until an acid number of 13 mg KOH/g is obtained. The resultant reaction product is neutralized with triethyl amine and emulsified in 55 kg water.

Using this emulsion, paints according to examples 1 and 2 were prepared.

In the accelerated weatherability test (1000 h QUV according to DIN 53384) a loss of gloss (method according to Gardner, 60°) of about 25% for the white paint (according to example 1) and 20% for the clear paint (according to example 2), as well as a just visible light yellowing in both cases were detected.

The invention claimed is:

1. A two-component water-based paint system, comprising:
    a polyester resin component (A) that is an aqueous emulsion of a hydroxy-functional polyester resin, which does not contain any ethylenically unsaturated monofunctional carboxylic acid moieties, and which is obtained by reaction of a composition, which comprises
        (i) at least one low-molecular polyvalent alcohol having at least two hydroxyl groups per molecule,
        (ii) at least one polyether polyol,
        (iii) at least one monofunctional saturated aliphatic, cycloaliphatic or aromatic carboxylic acid, and
        (iv) at least one polycarboxylic acid having at least two carboxyl groups; and
    an isocyanate component (B);
    the polyester resin component (A) and the isocyanate component (B) being provided as separate components suitable for mixing together by an applicator for application to a substrate, the resulting mixture having a pot life such that the mixture must be applied to the substrate before the hydroxy-functional polyester resin and the isocyanate component have fully reacted, wherein the resin is additionally modified by reaction with isocyanate prior to mixing the polyester resin component (A) and the isocyanate component (B) to form a mixed paint system.

2. The two-component water-based paint system according to claim 1, wherein said component (i) is a mixture of at least two different polyols each having at least two hydroxyl groups per molecule and the average functionality is at least 2.0.

3. The two-component water-based paint system according to claim 1, wherein said component (iii) is selected from compounds of the general formula

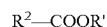

wherein $R^2$ is an aromatic, optionally substituted by straight-chain or branched alkyl groups, hydrocarbon group or a straight-chain or branched saturated aliphatic or cycloaliphatic hydrocarbon group, and R' is a hydrogen atom, a straight-chain or branched $C_1$-$C_4$ alkyl group or a —$(CO)R^2$ group.

4. The two-component water-based paint system according to claim 1, wherein said component (iii) is a mixture of at least two different saturated monocarboxylic acids.

5. The two-component water-based paint system according to claim 1, wherein said component (iv) is a mixture of at least two different polycarboxylic acids having each at least two carboxyl groups per molecule, and the average functionallity is at least 2.0.

6. The two-component water-based paint system according to claim 1, wherein the composition has 10 to 40 wt % of component (i), 3 to 15 wt % of component (ii), 10 to 40 wt % of component (iii) and 10 to 40 wt of component (iv).

7. The two-component water-based paint system according to claim 1, wherein the amount of hydroxyl of the resin is in the range of 1 to 8 wt %.

8. A method of painting a substrate comprising
a) providing an aqueous emulsion of a hydroxy-functional polyester resin, which does not contain any ethylenically unsaturated monofunctional carboxylic avid moieties which contains
   (i) at least one low-molecular polyvalent alcohol having at least two hydroxyl groups per molecule,
   (ii) at least one polyether polyol,
   (iii) at least one monofunctional saturated aliphatic, cycloaliphatic or aromatic carboxylic acid, and
   (iv) at least one polycarboxylic acid having at least two carboxyl groups;
b) providing an isocyanate component;
c) mixing die aqueous emulsion with the isocyanate component to form a mixed paint system; and
d) applying the mixed paint system to a substrate before the hydroxy-functional polyester resin and the isocyanate component have fully reacted.

9. The method according to claim 8, wherein said component (i) is a mixture of at least two different polyols each having at least two hydroxyl groups per molecule and the average functionality is at least 2.0.

10. The method according to claim 8, wherein said component (iii) is selected from compounds of the general formula

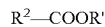

$$R^2\text{—COOR'}$$

wherein $R^2$ is an aromatic, optionally substituted by straight-chain or branched alkyl groups, hydrocarbon group or a straight-chain or branched saturated aliphatic or cycloaliphatic hydrocarbon group, and R' is a hydrogen atom, a straight-chain or branched $C_1$-$C_4$ alkyl group or a —$(CO)R^2$ group.

11. The method according to claim 8, wherein said component (iii) is a mixture of at least two different saturated monocarboxylic acids.

12. The method according to claim 8, wherein said component (iv) is a mixture of at least two different polycarboxylic acids having each at least two carboxyl groups per molecule, and the average functionality is at least 2.0.

13. The method according to claim 8, wherein the composition has 10 to 40 wt % of component (i), 3 to 15 wt % of component (ii), 10 to 40 wt % of component (iii) and 10 to 40 wt % of component (iv).

14. The method according to claim 8, wherein the amount of hydroxyl of the resin is in the range of 1 to 8 wt %.

15. The method according to claim 8, wherein the hydroxy-functional polyester resin is additionally modified by reaction with isocyanate prior to mixing the aqueous emulsion with the isocyanate component to form a mixed paint system.

* * * * *

UNITED STATES PATENT AND TRADEMARK OFFICE
CERTIFICATE OF CORRECTION

PATENT NO. : 7,262,255 B2  Page 1 of 1
APPLICATION NO. : 10/473306
DATED : August 28, 2007
INVENTOR(S) : Reinhard Winter et al.

It is certified that error appears in the above-identified patent and that said Letters Patent is hereby corrected as shown below:

On the Title page, item [56]:

Other Publications, Front Page, Second Column
This reference was previously initialed by the Examiner but omitted from the patent:
should be --Römpp Chemie Lexikon, Georg Thieme Verlag Stuttgart, New York, pp. 1363-1364--

Column 11:

Claim 8, lines 19-20
"carboxylic aviv moieties" should be --carboxylic acid moieties--

Claim 8, line 29
"mixing die aqueous emulsion" should be --mixing aqueous emulsion--

Signed and Sealed this

Thirtieth Day of November, 2010

David J. Kappos
*Director of the United States Patent and Trademark Office*